Dec. 13, 1955     F. V. REILLEY     2,726,669
CONTROL APPARATUS
Filed Aug. 27, 1954
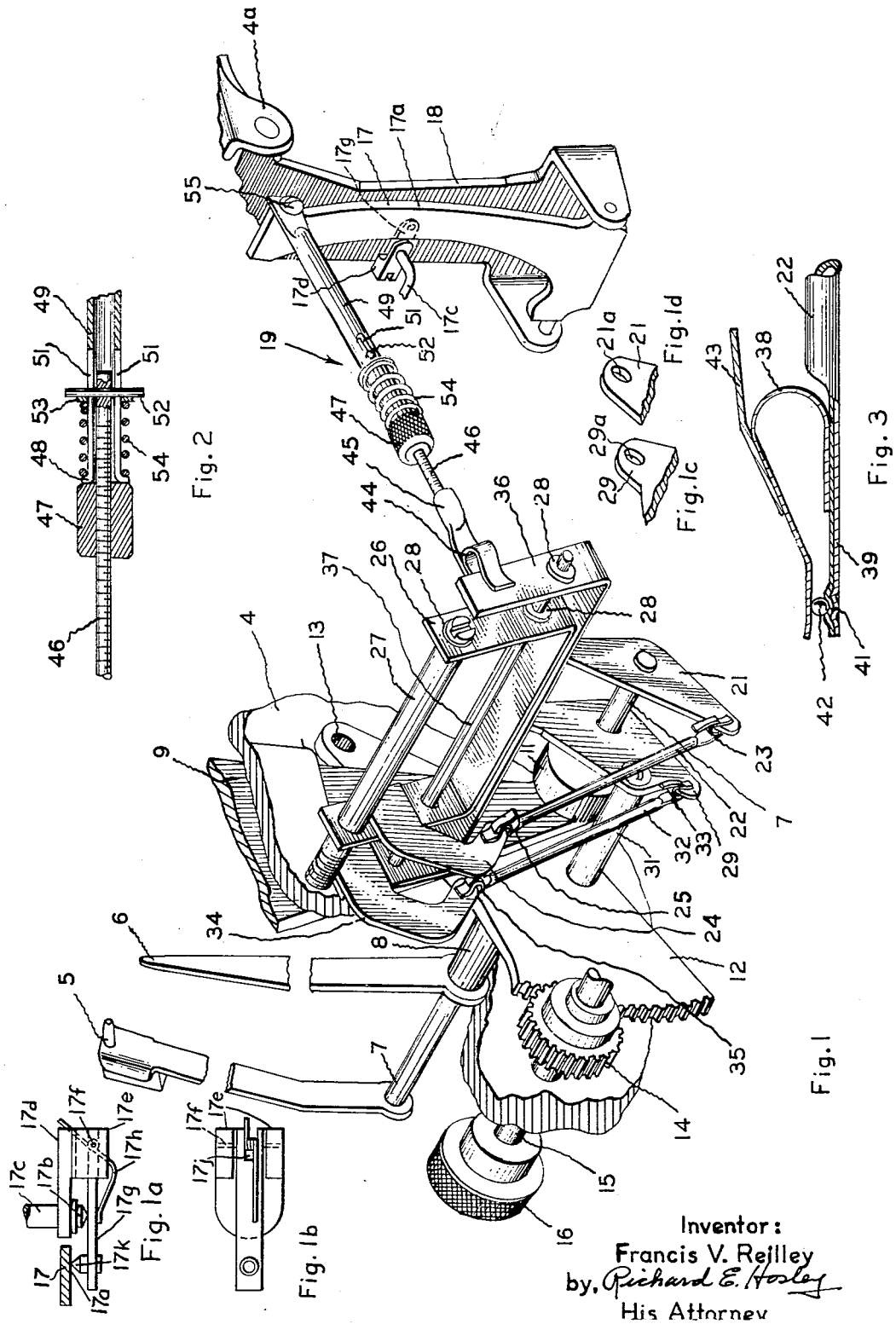
Inventor:
Francis V. Reilley
by, *Richard E. Hosley*
His Attorney United States Patent Office 2,726,669
Patented Dec. 13, 1955

2,726,669

CONTROL APPARATUS

Francis V. Reilley, West Peabody, Mass., assignor to General Electric Company, a corporation of New York Application August 27, 1954, Serial No. 452,660

8 Claims. (Cl. 137—85)

This invention relates generally to control apparatus and in particular to improvements in such apparatus for adjusting the control effect of a pneumatic control device.

In the art of condition controlling equipment, a common form of such devices may embody some kind of measuring system having therein a member moving in response to changes in a condition. Such a member may be a pen moving across a suitable cooperating chart to produce a visible record of the variation in magnitude of the condition being measured. In many cases, these devices embody a suitable power servo system to provide sufficient torque for properly moving and positioning the various parts of the system and, in many instances, such devices may have combined therewith some form of control equipment operating to maintain any desired predetermined magnitude of a condition. One popular and useful form of such control equipment is the pneumatic type wherein proper control of the bleed rate of an orifice can be utilized to produce variable pressure effects in a pneumatic control system. Such variable pressure effects can be related to suitable pressure responsive valves, or other control devices whereby the condition is directly regulated, or other effects are changed to achieve adequate indirect regulation of the condition. For example, a suitable diaphragm valve may be actuated to control the supply of a gas or liquid fuel to a furnace whose temperature is being controlled by the control apparatus. In such systems, it is usually desirable to provide means for adjusting the control effect thereof, i. e., to different degrees of temperature, and this adjustment must be easily and accurately reflected into the system for proper performance thereof.

Accordingly, it is an object of this invention to provide control apparatus having improved means for adjusting the control effect thereof.

It is a further object to provide such means for a pneumatic control device having a control link moving in response to changes in a condition.

Other objects of the invention, together with the benefits and advantages to be derived therefrom, will be apparent upon reference to the detailed specification set forth below, taken in conjunction with the drawing annexed hereto, in which:

Figure 1 is a perspective view in elevation of the novel control apparatus, showing the means for adjusting the control effect of a measuring system equipped with a pneumatic control device;

Figure 1a is a partial view, partly in section, of an orifice-flapper assembly which cooperates with the control apparatus shown in Figure 1.

Figure 1b is an end view of the orifice-flapper assembly shown in Figure 1a.

Figure 1c is a partial view in perspective of that portion of one of the crank members illustrated in Figure 1 but not fully shown therein.

Figure 1d is a partial perspective view of a portion of another crank member illustrated in Figure 1 but not fully shown therein.

Figure 2 is an enlarged view, partly in section, of the means for adjusting the length of the control link shown in Figure 1; and Figure 3 is an enlarged view, partly in section, of a resilient link fastening member used to connect certain of the parts shown in Figure 1.

Referring now to Figure 1 there is shown a portion of the support casing 4 of a condition responsive measuring and controlling device. The measuring system used may be of the type shown in U. S. Patent No. 2,645,748, Hansen, Jr., issued July 14, 1953, and assigned to applicant's assignee, wherein a servo motor drives a pen across a chart in response to changes in a condition being measured. Although Figure 1 of the aforesaid patent shows a strip form of chart recorder, the embodiment shown herein is part of a conventional round chart recorder. Cooperating with the measuring system is a suitable pneumatic control device of the well known type having an orifice in proximity to a movable flapper member whereby the bleed or exhaust through the orifice can be controlled by the position of the flapper so as to produce pressure variations in the pneumatic system. As is well understood in this art, these pressure variations can be utilized to produce control effects, and the structure described in detail below covers novel and improved means for selectively adjusting the control point of the aforesaid control effects. Since the details of the measuring system, the recorder, and the pneumatic control device are well known and understood by those skilled in the art, further discussion thereof has been omitted in the interest of brevity, particularly since such details form no part of the subject invention.

The casing portion 4 underlies a suitable chart (not shown) mounted to move with respect to pen 5 and set pointer 6, the latter parts being carried by a pair of rotatably mounted concentric shafts 7, 8 respectively. The shaft 8 is in the form of a bushing journalled for rotation in a suitable aperture extending through the casing 4. The shaft 7 passes through the bushing 8 and is journalled for rotation therein.

Connected to the shaft 7 is the sector member 9, only a part of which is shown, this sector member being driven by a suitable servo system in response to changes in the magnitude of a condition under measurement. The sector 9 has the hub portion through which the shaft 7 passes and the sector and shaft are connected rigidly together by means of suitable set-screws mounted in the hub 11. Thus, any motion of sector 9 causes pivotal motion of shaft 7.

The shaft 8 has its inner end staked to sector 12 and may be moved thereby upon pivotal motion of the sector 12 about shaft 7. To move the sector 12, there is provided a pinion 14 carried by a shaft 15 rotatably mounted in the casing 4 and extending therethrough to the front of the casing. Mounted on the outer end of shaft 15 is a knurled knob 16 provided to permit ready adjustment of the position of shaft 15 simply by manipulation thereof. Thus, the set pointer 6 may be selectively positioned at any predetermined point across the recorder chart corresponding to any desired predetermined magnitude of the condition being measured. The set pointer will indicate the control point of the equipment and the linkage connected thereto will serve to establish this control point in the control system.

A suitable control lever 17 is shown pivotally mounted in a bracket 18 which in turn is pivotally mounted on another portion 4a of the casing 4. The control lever 17 has a flat section 17a centrally disposed throughout its length and having a substantially arcuate form to cooperate with an orifice-flapper assembly mounted adjacent thereof. Referring to Figures 1a and 1b, this assembly will be readily understood and is seen to comprise an orifice 17b carried at the extremity of a pneumatic tube 17c, a portion of which is shown in the drawings, it being noted that the pneumatic tube bends away from the orifice at right angles thereto so that it can extend away from the control linkage assembly to a suitable source of pneumatic pressure. This tube is pivotally mounted so that the position of the orifice-flapper assembly with respect to the link 17 can be adjusted along the arcuate section of the lever to achieve a suitable proportioning band width in a pneumatic controller associated with the control linkage.

The tube 17c has affixed thereto, by any suitable means, a supporting block 17d extending rearwardly with respect to the link 17. This supporting member has a pair of upper and lower ears 17e provided with suitable apertures therein for receiving a pin shaft 17f. This pin shaft passes through a suitable aperture in a flapper 17g, and the arrangement is such that the flapper is free to pivot about the shaft as an axis. A suitable spring 17h is coiled around a portion of the pin shaft 17f and is positioned within a notch 17j provided in the flapper. The action of this spring is to urge the flapper against the orifice 17b in which position the orifice is completely covered and exhausts no air from the pneumatic system feeding it.

The outer end of the flapper has a tapered pin 17k which bears against the flat portion 17a of the lever as is clearly shown in Figures 1 and 1a. It will be apparent that the lever 17 bears against the flapper to control its position with respect to the orifice whereby the bleed rate of the orifice may be varied to produce a control effect. This comes about through motion of the lever 17 imparted to it by the aforementioned linkage system.

A control link 19 is connected to the outer end of the member 17 by means of the bolt 55 and moves the flapper to various control positions in response to motion imparted thereto. This link is positioned by the interaction of a pair of control members which, in turn, are operatively linked to the shafts 7, 8.

Thus, shaft 7 has staked to its inner end a crank member 21 rotating therewith and having a connecting rod 22 detachably affixed thereto by means of the spring clip 23. The other end of rod 22 is detachably affixed to the bell crank 24 by means of spring clip 25, and the bell crank 24 is, in turn, affixed to a first control member in the form of a U-shaped control bracket 26 pivotally mounted on the shaft 27, which, in turn, is suitably affixed to the casing 4.

The shaft 27 passes through both legs of the U-bracket 26, and the bracket is retained in place by a pair of C-washers inserted into suitable grooves in the shaft 27 provided on both sides of the bracket leg furthest from the casing. One of the C-washers is shown at 28 and is of the type that snaps into place for completion of the assembly.

To bring the motion of shaft 8 out to control link 19, it has a crank member 29 rotatably mounted on shaft 7 and connected to the sector 12 by means of the spacer and bolt arrangement 31. The crank 29 has a connecting rod 32 connected thereto by means of spring clip 33, the other end of this rod being detachably connected to a second bell crank 34 by means of the spring clip 35.

The bell crank, in turn, is connected to a second control member in the form of a second U-shaped control bracket 36 pivotally mounted on bracket 26 by means of the shaft 37. This shaft passes through all of the legs of the control brackets and the parts are held in place by means of additional C-washers 28 snapped into appropriate grooves provided in shaft 37.

The control link 19 is connected to bracket 36 by means of a spring clip 44, similar in all respects to the other clips except that it is not specifically designed to be opened. One of these latter clips is shown in detail in Figure 3 and comprises the spring member 38 rigidly affixed to the flattened end 39 of the connecting rod 22. The outer portion of the flattened end is dimpled at 41 to cooperate with the ball 42 which is located therein and welded thereto. The structure so far described is common with all of the clips 23, 25, 33, 35, and 44, and in each case, the part to which the clips are attached, namely the cranks 21, 29, bell cranks 25, 34, and bracket 36, have suitable apertures therein to permit the balls 42 to pass therethrough. When connections are made, the clips are snapped into place, the spring members opening enough to permit the flat sections of the connection to be inserted therein. When the parts are joined together, a simple pivotal connection is obtained.

All clips except clip 44 are provided with an arm 43 attached to the spring member 38 so that they can be easily squeezed to permit ready separation of the clips from their associated cranks as desired.

The clip 44 is carried by one end of the short connecting rod 45, the other end of which carries the threaded rod 46. A knurled nut 47 rides on the rod 46 and is adapted to abut the flanged extremity 48 of the link connecting rod 49. The rod 49 is hollow and is transversely slotted at 51 at its outer extremity to receive therein the end of rod 46 to which is affixed the transverse pin 52. A washer 53 surrounds the rod 49 and provides a bearing surface for one end of a helix spring 54 surrounding the rod 49 and having its other end bearing on the inner side of the rod flange 48. This arrangement of the parts permits quick and easy adjustment of the length of the link 19, as desired for proper calibration of the apparatus.

With the above arrangement of the parts in mind, the operation of the control apparatus will now be apparent. First, assume that the set pointer 6 has been adjusted to a predetermined magnitude of a condition. Now, if the condition being controlled has a magnitude corresponding to said predetermined magnitude, the pen 5 will indicate and record this magnitude, and in the embodiment shown, the pen arm and set-pointer arm will be aligned. Their respective shafts will position their associated cranks and linkage so that the control brackets 26 and 36 are aligned. In this position of the parts, the point of connection of the control link with the bracket 36 will be aligned with the axis of shaft 27, and the link will be in a neutral position.

If the condition, and assuming it to be temperature but not limited thereto, should change, the recording pen will assume a new position corresponding to the change and the system will then be unbalanced. The motion of the pen is also transmitted to control bracket 26 and causes it to pivot about its shaft 27 and assume a new position corresponding to the change. As the bracket 26 pivots about its shaft, it moves the shaft 37, causing the bracket 36 to move slightly therewith. Motion of bracket 36 causes the control link 19 to move therewith, and it will assume a control position and properly position the flapper to initiate a control action in a restoring direction. As the system responds to the control action, the condition will begin to return to its pre-set value and this will cause action of the control apparatus in a direction to reduce the control effect of the system; that is, the bracket 26 will begin to move to a neutral position. When balance is achieved, the parts will be in alignment once again and control action will be suspended.

It makes no difference whether the magnitude of the condition changes in an increasing or decreasing direction with respect to the pre-set value, as the control brackets will accurately follow the change and position the control link in its proper control position.

In the embodiment illustrated, any increase in temperature will cause the pen arm 5 to rotate in a clockwise direction as viewed in the drawings. This pulls the control link 19 to the left and allows the flapper to cover the control orifice. A pressure increase results in the pneumatic control system, and this action is commonly referred to as "direct operation" of the system.

For a "reverse operation," the same motion of the pen 5 would cause the control link 19 to move to the right and thereby move the flapper away from the orifice to produce a pressure decrease in the pneumatic control system. This "reverse operation" is accomplished by changing the point of connection shown in Figure 1 between the rods 22, 32, and their associated cranks 21, 29 and moving the rods to the opposite ends of the cranks shown in Figures 1c and 1d, both of which are provided with suitable apertures 21a and 29a to permit the rods to be easily snapped in place. These apertures 21a and 29a are disposed approximately 135 degrees in a clockwise direction from their counterparts on the opposite ends of the cranks. With the rods in their new positions, it is readily apparent how the "reverse operation" occurs, for in the position shown in Figure 1, clockwise motion of the pen arm 5 results in a lifting of rod 22, whereas if this rod were connected on the other side of crank 21, it would be pulled downwardly.

Now, if it is desired to change the magnitude of the pre-set condition control point, it is only necessary to move the set-pointer to the newly selected control point and the system will automatically adjust itself to this new magnitude. When adjusting the position of the set-pointer, the control bracket 36 will be pivoted about its shaft to a new position, moving therewith the control link 19. For example, assuming that the system is operating at its set-point with the pen 5 and pointer 6 in alignment, and that it is found desirable to move the set-point of the system to a higher temperature, the pointer 6 will be moved in a clockwise direction to the new set-point. Crank 29 will move in a clockwise direction, lifting the rod 32 and thereby moving bracket 36 in a clockwise direction. Since the pen 5 is not moving at this time, the bracket 36 will move clockwise with respect to bracket 26 and have the effect of moving link 19 to the right to open up the orifice 17b and allow the pressure of the pneumatic control initiator to fall. This change in control pressure will initiate system action to increase system temperature, and as the temperature rises, pen 5 will move upscale in a clockwise direction toward set-pointer 6. Once the pen begins to move upscale, crank 21 will start moving in a clockwise direction to lift its connecting rod 22 and thus move the bracket 26 in a clockwise direction. As described above, this action of bracket 26 will have the effect of moving bracket 36 in a counter-clockwise direction, which, of course, causes the link 19 to move to the left in an orifice closing direction to increase the pressure in the pneumatic control initiator.

Should the set-pointer 6 ever be moed to a new set-point position corresponding to a lower system temperature, then the reverse of the above cycle of operation will take place.

It is to be noted that so long as the brackets 26 and 36 are aligned, the link 19 is in its neutral position. When this alignment is changed and the parts are angularly disposed with respect to one another, the control link will be in a control position.

Thus, there is provided a very effective control apparatus for adjusting the control point of a pneumatic control device. The neutral position is one corresponding to aligned parts, and this arrangement facilitates and simplifies calibration of the system. Moreover, interchangeability and duplication of parts have been effectively used, resulting in practical advantages in manufacture and use. Simplicity has keynoted the design, resulting in a significant reduction in complexity over arrangements heretofore proposed for use.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. Control apparatus, comprising: a first pivotally mounted control bracket, means for moving said first bracket in response to changes in a condition, a second control bracket pivotally mounted on said first bracket, means for selectively moving said second bracket to predetermined positions corresponding to predetermined magnitudes of said condition, and a control link connected to said second bracket and movable therewith, said brackets having corresponding parts in alignment when said condition has a magnitude corresponding to said predetermined condition and having said parts angularly disposed with respect to each other when the magnitude of said condition differs from said predetermined condition, said control link having a neutral position corresponding to said aligned position of said brackets and having control positions corresponding to said angularly disposed positions.

2. Control apparatus, comprising: a first pivotally mounted control bracket, first means moving in response to changes in a condition, a second control bracket pivotally mounted on said first bracket, second means selectively movable to predetermined positions corresponding to predetermined magnitudes of said condition, connections between said first and second moving means and said first and second brackets, respectively, and a control link connected to said second bracket and moving therewith, said brackets having corresponding parts in alignment when said condition has a magnitude corresponding to said predetermined magnitude and having said corresponding parts angularly disposed with respect to each other when the magnitude of said condition differs from said predetermined magnitude, said control link having a neutral position corresponding to said aligned position of said brackets and having control positions corresponding to said angularly disposed positions.

3. Control apparatus, comprising: a first shaft, a first control member pivotally mounted on said shaft, a second shaft parallel to and spaced from said shaft, said second shaft being carried by said first control member, a second control member pivotally mounted on said second shaft, means to move said first control member about its pivot in response to changes in a condition, means to selectively move said second member about its pivot to predetermined positions corresponding to predetermined magnitudes of said condition, and a control link connected to said second member and movable therewith, said control link having a neutral position corresponding to an aligned position of portions of said control members and having control positions corresponding to angularly disposed positions of said portions.

4. Control apparatus, comprising: a first driving shaft rotating in response to changes in a condition, a second driving shaft surrounding said first shaft and selectively rotatable to predetermined positions corresponding to predetermined magnitudes of said condition, a first pivotally mounted control member, a second control member pivotally mounted on said first member, first and second connecting links between said first and second shafts and said first and second control members, respectively, said second control member having a portion thereof coaxial with the pivot axis of said first member when the magnitude of said condition corresponds to said predetermined magnitude, and a control link connected to said portion and moving therewith, said control link having a neutral position corresponding to said coaxial disposition of said connected portion and having control positions corresponding to any deviation from said coaxial disposition.

5. Control apparatus, comprising: a first driving shaft rotating in response to changes in a condition, a second driving shaft surrounding said first shaft and selectively rotatable to predetermined positions corresponding to predetermined magnitudes of said condition, a first U-shaped pivotally mounted control bracket, a second U-shaped control bracket pivotally mounted on said first bracket, said first bracket nesting in said second bracket, first and second connecting means between said first and second shafts and said first and second control brackets, respectively, and a control link connected to said second bracket and movable therewith, said brackets having their legs in alignment when the magnitude of said condition corresponds to said predetermined magnitude and having their legs angularly disposed to each other when the magnitude of said condition deviates from said predetermined magnitude, said control link having a neutral position corresponding to said aligned position and having control positions corresponding to said angularly disposed positions.

6. Control apparatus, comprising: a first driving shaft rotating in response to changes in a condition, a second driving shaft surrounding said first shaft and selectively rotatable to predetermined positions corresponding to predetermined magnitudes of said condition, a first U-shaped pivotally mounted control bracket, a second U-shaped control bracket pivotally mounted on said first bracket, said brackets being arranged in nesting relationship, a first and second crank connected to said first and second shafts, respectively, a first and second bell crank connected to said first and second control brackets, respectively, first and second rigid links pivotally connected between said first and second cranks and said first and second bell cranks, respectively, and an adjustable control link connected to said second control bracket and movable therewith, said legs of said brackets being aligned when the magnitude of said condition corresponds to said predetermined magnitude to position said control link in a neutral position, said legs of said brackets being angularly disposed to each other for all other magnitudes of said condition to position said control link in various control positions.

7. Control apparatus, comprising: a first driving shaft rotating in response to changes in a condition, a second driving shaft surrounding said first shaft and selectively rotatable to predetermined positions corresponding to predetermined magnitudes of said condition, a first U-shaped pivotally mounted control bracket, a second U-shaped control bracket pivotally mounted on said first bracket, said brackets being arranged in nesting relationship, a first and second crank connected to said first and second shafts, respectively, a first and second bell crank connected to said first and second control brackets, respectively, first and second rigid links pivotally connected between said first and second cranks and said first and second bell cranks, respectively, and an adjustable control link connected to said second control bracket and movable therewith, said legs of said brackets being aligned when the magnitude of said condition corresponds to said predetermined magnitude to position said control link in a neutral position, said legs of said brackets being angularly disposed to each other for all other magnitudes of said condition to position said control link in various control positions, each of said first and second cranks having substantially oppositely disposed points of connection for said first and second rigid links, said first and second rigid links being detachably affixed to said first and second cranks and selectively positioned at either of said connecting points whereby the direction of motion of said control link may be reversed for unidirectional changes in the magnitude of said condition.

8. In a pneumatic control device of the type having a movable flapper controlling the operation of an associated orifice member, control apparatus therefor, comprising: a first driving shaft rotating in response to changes in a condition, a second driving shaft selectively rotatable to predetermined positions corresponding to predetermined magnitudes of said condition, a first pivotally mounted control member, a second control member pivotally mounted on said first member, first and second means interconnecting said first and second shafts and said first and second control members, respectively, and an adjustable control link connected to said second control member and movable therewith to control the position of said flapper, said control members having corresponding parts in alignment when the magnitude of said condition corresponds to said predetermined magnitude whereby said flapper is moved to a neutral position, said corresponding parts being angularly disposed relative to each other for all other magnitudes of said condition whereby said flapper has various control positions.

References Cited in the file of this patent
UNITED STATES PATENTS

| | | |
|---|---|---|
| 2,062,437 | Abbott | Dec. 1, 1936 |
| 2,413,584 | Side | Dec. 31, 1946 |
| 2,455,326 | Bowditch | Nov. 30, 1948 |
| 2,631,570 | Bowditch | Mar. 17, 1953 |